(12) United States Patent
Karem (10) Patent No.: US 8,366,049 B2
(45) Date of Patent: Feb. 5, 2013

(54) HOVER DELIVERY OF CABIN PAYLOAD IN TILT-ROTOR AND TILT-WING AIRCRAFT

(76) Inventor: Abe Karem, Tustin, CA (US)

( * ) Notice: Subject to any disclaimer, the term of this patent is extended or adjusted under 35 U.S.C. 154(b) by 790 days.

(21) Appl. No.: 12/576,119

(22) Filed: Oct. 8, 2009

(65) Prior Publication Data

US 2010/0171001 A1   Jul. 8, 2010

Related U.S. Application Data

(60) Provisional application No. 61/104,226, filed on Oct. 9, 2008.

(51) Int. Cl.
*B64C 1/22* (2006.01)
(52) U.S. Cl. .................. 244/137.1; 244/118.1
(58) Field of Classification Search ............ 244/137.1, 244/118.1, 137.4; 294/82.26
See application file for complete search history.

(56) References Cited

U.S. PATENT DOCUMENTS

| | | | | |
|---|---|---|---|---|
| 3,212,737 A * | 10/1965 | Katzenberger | ............ | 244/137.1 |
| 3,805,977 A * | 4/1974 | Fritzsche et al. | ............ | 414/560 |
| 4,349,168 A * | 9/1982 | Barnes et al. | ............ | 244/137.3 |
| 4,416,436 A | 11/1983 | Wilson, Jr. | | |
| 4,536,024 A | 8/1985 | Gabriel | | |
| 4,695,012 A | 9/1987 | Lindenbaum | | |
| 5,092,541 A | 3/1992 | Tofflemire et al. | | |
| 5,499,785 A * | 3/1996 | Roberts et al. | ............ | 244/137.4 |
| 5,816,535 A * | 10/1998 | Underwood et al. | ...... | 244/137.3 |
| 6,845,939 B1 * | 1/2005 | Baldwin | ............ | 244/7 R |
| 7,338,015 B1 * | 3/2008 | Sarigul-Klijn et al. | .... | 244/137.3 |
| 7,344,109 B1 | 3/2008 | Reza | | |
| 7,900,866 B2 * | 3/2011 | Kutzmann et al. | .......... | 244/1 TD |
| 7,909,287 B2 * | 3/2011 | Guering | ............ | 244/118.2 |
| 8,141,821 B1 * | 3/2012 | Pancotti et al. | ............ | 244/129.5 |
| 2003/0222177 A1 * | 12/2003 | Bonisch | ............ | 244/137.1 |
| 2007/0200032 A1 | 8/2007 | Eadie et al. | | |

* cited by examiner

*Primary Examiner* — Christopher P Ellis
(74) *Attorney, Agent, or Firm* — Fish & Associates, PC (57) ABSTRACT

A payload or cargo is delivered from a cargo hold of an aircraft during flight, by orienting the fuselage into a nose-up and tail-down position of at least 30 degrees off horizontal, and lowering the cargo from a cargo hold in the fuselage by means of one or more lines. Preferred vertical takeoff and landing (VTOL) aircraft include tilt-rotor or tilt-wing aircraft, and especially preferred aircraft are capable of generating control moments with their rotors to assist in orientating the fuselage of the aircraft into a nose-up and tail-down position.

15 Claims, 7 Drawing Sheets

Figure 5A
HOVER - HELICOPTER MODE

Figure 5B
HOVER - FUSELAGE TILTING

Figure 5C
HOVER - VERTICAL POSITION

Figure 6A
PLACING CARGO ON BUILDING

Figure 6B
PLACING CARGO ON GROUND

Figure 7A
POSITIONING BY LINES

Figure 7B
POSITIONING BY MOVEMENT

HOVER DELIVERY OF CABIN PAYLOAD IN TILT-ROTOR AND TILT-WING AIRCRAFT

This application claims the benefit of priority to U.S. Provisional Application having Ser. No. 61/104,226 filed on Oct. 9, 2008. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is helicopters and other rotorcraft. (class 224/17.11)

BACKGROUND

Tilt-rotor aircraft are aircraft that hover like helicopters with their rotors turning in the horizontal plane (axis of rotation in the vertical plane), and tilt their rotors in the vertical plane to fly like propeller driven aircraft. The Bell™-Boeing™ V-22 and Bell™/Agusta™ 609 are examples of prior art tilt-rotor aircraft.

Tilt-wing aircraft have rotors or propellers installed on their wings, which can tilt from wing-borne propeller-driven flight to helicopter-like flight in which the propellers are more or less in the horizontal position. The Vought™/Hiller™/Ryan™ XC-142A is an example of a prior art tilt-wing aircraft.

The development of aircraft precision automatic flight control and of unmanned vertical take-off and landing (VTOL) aircraft provide for automated control of precision hover flight with no or minimal pilot input. Modern rotorcraft equipped with such systems can now routinely perform precision hover over a specified geographical point and therefore accurately place a cargo suspended below the rotorcraft. Such operation can either use the vertical motion of the rotorcraft or use a winch to lower the cargo to the desired position. The use of helicopters to perform short-range point-to-point external load pickup and delivery is referred to as aerial crane operations. Using helicopters for external load carriage over long distances is inefficient because of the drag of an external load and the inefficiency of conventional helicopter configurations in forward flight.

In most cases cargo aircraft, including cargo rotorcraft, have cabins or cargo holds that provide for internal carriage of cargo; such cargo holds often have a loading ramp that may further serve as a door to the cargo hold. The cargo hold and loading ramp arrangement provide for rapid roll-on and roll-off of wheeled and tracked vehicles, and for environmental protection of the cargo. Most importantly, the internal carriage of cargo provides a substantially lower air resistance (drag) in forward flight, as compared with cargo suspended below the rotorcraft. The lower drag allows for faster speed and increased range of the rotorcraft per available fuel amount. As used herein, any mention of "deliver", "lowering" and "placing" should be interpreted as conceptually including pick-up and lifting of cargo.

In conventional operations, delivery of internally carried cargo is performed either by rolling-off or extraction after landing, or in fixed wing aircraft, by horizontal extraction in forward flight using a parachute. Such horizontal extraction is used on military cargo aircraft including for example the Lockheed-Martin™ C-130.

Both of these prior art cargo delivery methods can be problematic. The roll-off after landing method requires a landing area suitable for the aircraft landing, which may not be available in rugged terrain or delivery in urban or forested areas. Alternately, the in-flight horizontal extraction method often cannot provide the desired precision and soft placement of the cargo.

Thus, there is still a need for improved apparatus, systems and methods for placement of internally carried cargo.

SUMMARY OF THE INVENTION

The present inventive subject matter provides apparatus, systems and methods in which a payload or cargo is delivered from a cargo hold of a vertical takeoff and landing (VTOL) aircraft during flight. As used herein the term "during flight" means that no portion of the aircraft is in contact with the ground, and a line extending from the aircraft is not considered part of the aircraft.

In preferred methods, a fuselage of the aircraft is oriented into a nose-up and tail-down position of at least 30 degrees off horizontal, and cargo is lowered from a cargo hold in the fuselage by means of one or more lines. The lines are subsequently uncoupled to release the payload at a desired delivery location or loading zone.

Preferred VTOL aircraft include tilt-rotor or tilt-wing aircraft, and especially preferred aircraft are capable of generating control moments with their rotors to assist in orientating the fuselage of the aircraft into a nose-up and tail-down position. Further, preferred aircraft have a cargo hold at least partially disposed within the fuselage of the aircraft.

In some classes of methods, the aircraft is converted from a wing-borne flight mode to a rotor-borne flight mode in order to hover over a loading zone to deliver or pick up a payload. The orienting of the fuselage can be advantageously performed after beginning conversion of the aircraft from a wing-borne flight mode to a rotor-borne flight mode. Alternatively, the step of orienting the fuselage can be performed after completion of conversion of the aircraft from wing-borne flight mode to rotor-borne flight mode.

In preferred methods, the aircraft fuselage is oriented nose up within 5°, 10°, 15°, or 20° of vertical in order to assist with delivery of a payload. Orienting the aircraft preferably comprises pointing the nose in a range from 45° to 100° nose up. It is contemplated that a partially or fully automatic control system could be used to orient the aircraft into a desired orientation. Such a system would reduce pilot workload while performing preferred methods of payload delivery.

When in the desired orientation, the cargo is lowered from the cargo hold using a cable, chain, strap, wire, rope or other line, and the line is uncoupled in order to release and deliver the cargo. The aircraft can be advantageously equipped with a guide that biases cargo against a floor of the cargo hold or that biases the cargo away from a wall of the cargo hold.

Some cargo, including for example a vehicle, have a wheels-down or track-down configuration, in which the cargo has a preferred orientation such that one side of the cargo should be delivered down. It is contemplated that a second line could be operated in conjunction with a first line to control orientation of the cargo during delivery and assist in positioning the cargo in the wheels-down or track-down configuration. Alternately, it is contemplated that horizontal movement of the aircraft could be used to help position the cargo in the wheels-down or track-down configuration.

DETAILED DESCRIPTION

There is often a need for high-precision delivery of a payload from a cargo aircraft. In the following description and accompanying figures, apparatus, systems and methods are provided that allow for such precision delivery. In a preferred class of methods, the fuselage of the aircraft is oriented into a nose-up and tail-down position, the cargo is lowered from the cargo hold using a cable, chain, strap, wire, rope or other line, and the line is uncoupled to release the cargo.

Figure 1A:
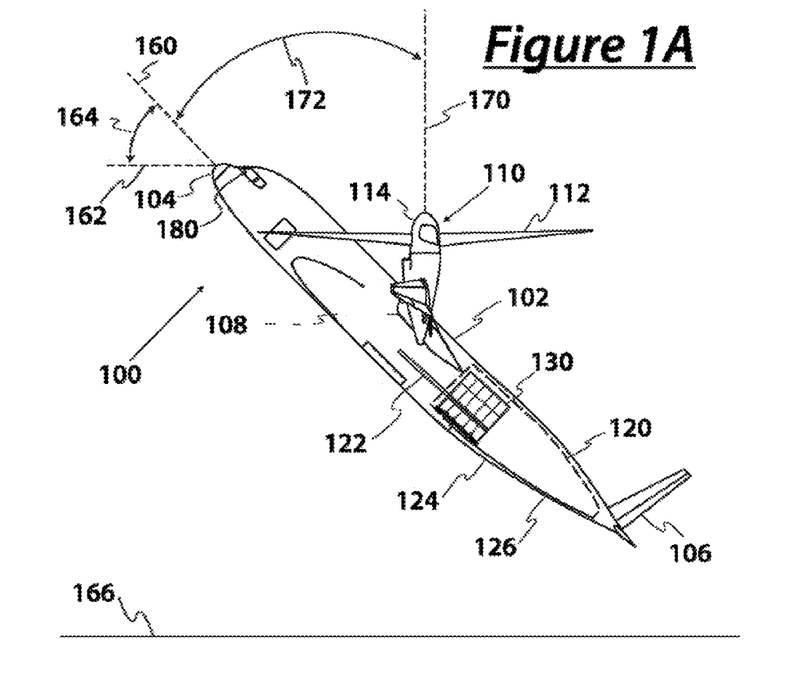
FIG. 1A is a side-view schematic of an especially preferred tiltrotor aircraft.

FIG. 1A is a side-view schematic of an especially preferred tiltrotor aircraft 100 comprising a first rotor 110, a fuselage 102, a wing 108, a nose 104, and a tail 106. The aircraft 100 has a pitch orientation with respect to the horizon 166. The aircraft axis 160 extends from the nose 104 of the aircraft 100 and is parallel with the fuselage 102. This axis 160 makes a pitch orientation angle 164 with a line 162 that is parallel with the horizon 166. Thus, the aircraft 100 has a pitch angle 164 with respect to the horizon 166. The horizon is defined as a plane perpendicular to a line running between the center of the earth and the aircraft center of mass. In general, when the pitch angle 164 is positive, the nose 104 of the aircraft 100 is higher than the tail 106. This is referred to as a nose-up and tail-down orientation.

In the especially preferred aircraft 100, the rotor 110 is tiltably coupled to the wing 108. The rotor 110 comprises blades 112 and a hub 114 that rotate about a rotor rotation axis 170. The rotor rotation axis 170 makes a rotor tilt angle 172 with the aircraft axis 160.

The fuselage 102 of the aircraft 100 preferably has an interior portion that serves as a cargo hold 120. The fuselage 102 is advantageously equipped with a cargo ramp door 124 and a fairing door 126 that, when open, allow for direct access to the cargo hold 120. Cargo 130 can be loaded into the cargo hold 120 through the doors 124, 126. All suitable cargo is contemplated, including pallets, vehicles, personnel, and other cargo.

Figure 1B:
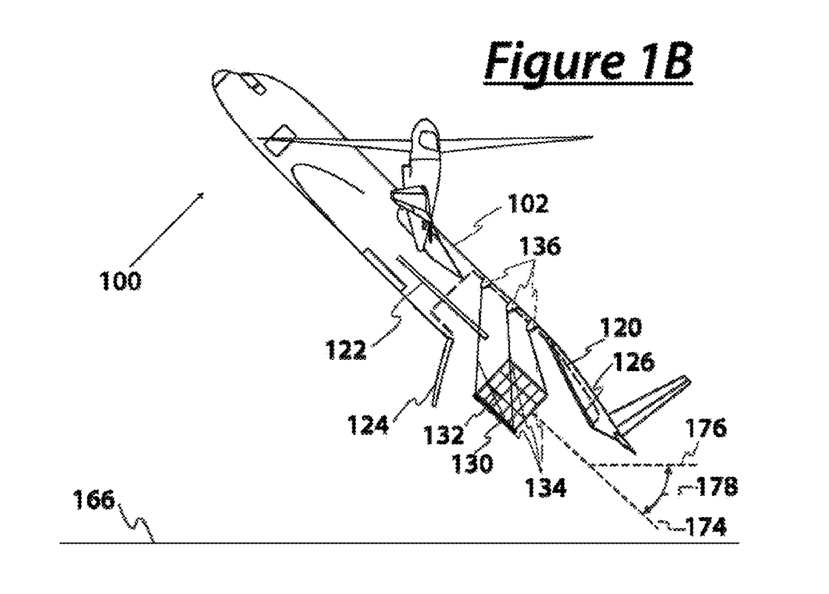
FIG. 1B is another side view schematic of the same aircraft of FIG. 1A unloading and delivering cargo according to preferred methods.

FIG. 1B is another side view schematic of the aircraft 100 of FIG. 1A, shown unloading cargo according to preferred methods. The fuselage 102 is also advantageously equipped with a guide rail 122 that serves as a guide that biases the cargo 130 against a floor of the cargo hold 120 and also away from a wall of the cargo hold 120. The cargo 130 is advantageously equipped with a guide element 132 that mates with the guide rail 122 in the cargo hold 120.

The fuselage 102 or cargo hold 120 can be advantageously equipped with attachments 136 that can be configures to support lines 134. All suitable attachments are contemplated including winches, reels, hooks, hardpoints, and other attachments. All suitable lines are contemplated including rope, chain, multiple filament wire, single filament wire, and other lines. The cargo 130 has an orientation defined by an angle 178 between an axis 174 of the cargo 130 and a line 176 parallel with the horizon. The cargo axis 174 is preferably but not necessarily aligned (within 2°, 5°, or even 10°) with the fuselage axis 160 during normal flight. It may be advantageous to orient the cargo 130 such that the cargo axis 174 is not aligned with the aircraft axis 160 during loading and unloading according to preferred methods.

The cargo 130 can be advantageously supported by means of lines 134 coupling the cargo 130 to the attachments 136 to the fuselage 102 during loading and unloading. The orientation angle 178 of the cargo 130 can be controlled by adjusting the relative length of the lines 134. It is contemplated that an aircraft 100 can be equipped with automatic control system that automatically adjust the length of the lines 134 to control the orientation angle 178 of the cargo to a desired orientation. It is contemplated that the orientation of the cargo could be controlled in pitch, roll, and potentially yaw depending on the configuration of the lines. Some cargo including, for example, a vehicle may have wheels and has a preferable orientation for delivery. A vehicle's nominal orientation for driving is referred to as its wheels-down or track-down configuration. It is contemplated that the length of the lines 134 supporting a cargo with a wheels-down or track-down configuration can be differentially adjusted to help position the cargo in the wheels-down or track-down configuration upon delivery.

Preferred lines 134 can be uncoupled from either their attachments 136 to the fuselage 102 or from the cargo 130 itself thereby allowing the cargo 130 to be dropped and delivered. Thus, an aircraft 100 can lower and subsequently deliver cargo 130 from a cargo hold 120 by means of lines 134 and an advantageous orientation of the aircraft 100 and fuselage 102.

During delivery of a cargo 130, the aircraft can have a partially nose-up and tail-down orientation or a completely vertical orientation. A vertical orientation is defined as the orientation when the pitch angle 164 is 90°. A horizontal orientation of the aircraft corresponds to a pitch angle 164 of 0°. The nose-up and tail-down orientation need not be perfectly vertical, and indeed very likely will be off-vertical with a pitch angle of more than 85°, 80°, 75°, 70°, or even less. Unless the context dictates the contrary, all ranges set forth herein should be interpreted as being inclusive of their endpoints. Similarly, all lists of values should be considered as inclusive of intermediate values unless the context indicates the contrary.

The step of orientating the aircraft in the pitch direction is referred to as pointing the nose of the aircraft. In especially preferred maneuvers, the nose may be pointed up by at least 30° off horizontal ("nose up") and more preferably from 45° to 100° nose up, or 60° to 90° nose up. One advantage of the aircraft being off-vertical is that there the cargo can still be gravitationally biased towards a floor of the cargo hold, thereby helping to prevent the cargo from colliding with the relatively soft walls or roof of the hold. Other biasing means are also contemplated, however, including the use of guides, straps, rollers constrained in races, and so forth.

In general, a vertical takeoff and landing (VTOL) aircraft is capable of generating equal or greater thrust than the weight of the vehicle and is also capable of directing this thrust downwards to counteract the weight of the vehicle and achieve takeoff. Several types of VTOL aircraft are contemplated, including tilt-rotor aircraft, tilt-wing aircraft, helicopters, and other VTOL aircraft. Tilt-rotor aircraft and tilt-wing aircraft are preferred types of VTOL aircraft. An aircraft that can takeoff vertically is capable of lifting off the ground under its own power in a substantially vertical direction, within 10 degrees off vertical.

Figure 2A:
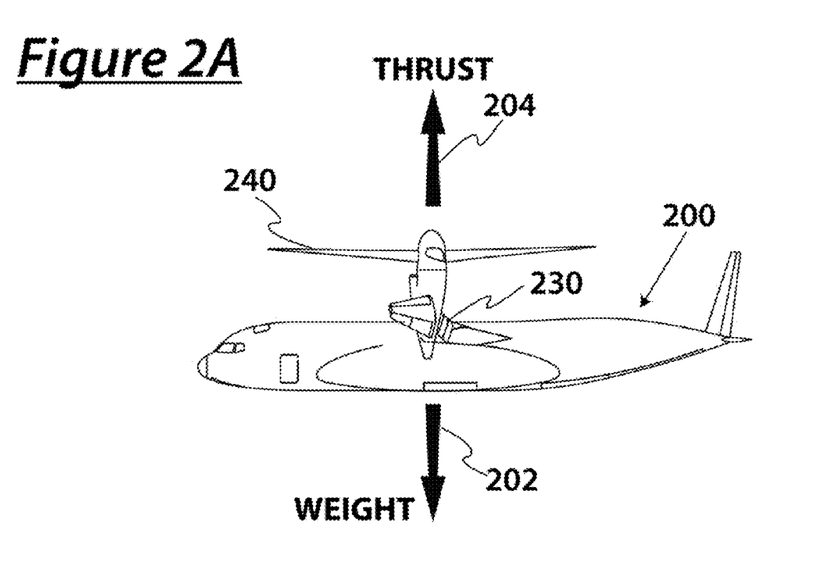
FIG. 2A is a side-view schematic a preferred tiltrotor aircraft in rotor-borne hover mode.
Figure 2B:
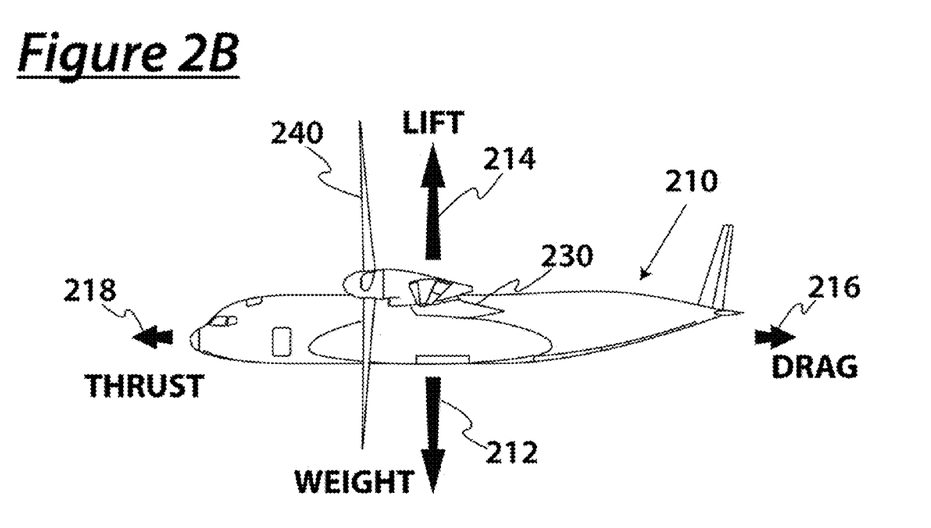
FIG. 2B is a side-view schematic of the aircraft of FIG. 2A in wing-borne airplane cruise mode.

An especially preferred VTOL aircraft is depicted in FIG. 2A and FIG. 2B, and is described in U.S. patent application Ser. No. 12/429982. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Some VTOL aircraft have multiple flight modes and convert between these modes. FIG. 2A is a side-view schematic a preferred tiltrotor aircraft in rotor-borne hover mode 200. FIG. 2B is a side-view schematic of the same preferred tiltrotor aircraft in airplane cruise mode 210. In hover mode, the aircraft 200 has a weight with a direction shown by arrow 202 and has rotors 240 that generate thrust in the direction shown by arrow 204. In hover mode, the aircraft has little or no forward velocity, and the wing 230 does not generate substantial amounts of lift. For aircraft with rotors or propellers, this flight mode is known as rotor-borne flight.

The same aircraft is shown tiltrotor aircraft in airplane cruise mode 210 in FIG. 2B. The aircraft 210 again comprises a rotor 240 and a wing 230. In cruise mode, the wing 230 generates sufficient lift with a direction shown by arrow 214 to counteract the weight of the aircraft as indicated by arrow 212. However, the wing lift is generated by air flowing around the wing airfoil surfaces, usually obtained by propelling the aircraft through the air with a forward velocity. In the case of a tiltrotor aircraft, the rotor 240 generates a thrust in the direction indicated by arrow 218 sufficient to overcome the aircraft drag 216 and maintain level flight. This flight mode is known as wing-borne flight.

Preferred tiltrotor and tilt-wing aircraft are capable of converting between hover mode flight and airplane cruise mode flight and back by rotating the propellers, rotors, or other thrust generating devices from one orientation to another with respect to the aircraft fuselage. This rotation may be accomplished by tilting a wing in the case of a tilt-wing aircraft or by tilting a rotor and rotor shaft in the case of a tilt-rotor aircraft. Preferred tiltrotor aircraft can be oriented after the beginning of conversion of the aircraft from a conversion of the aircraft from a wing-borne flight mode to a rotor-borne flight mode. It is contemplated that preferred aircraft could be oriented into a desired orientation after completion of conversion of the aircraft from a wing-borne flight mode to a rotor-borne flight mode. Alternatively, a preferred aircraft could be maneuvered into a desired orientation directly from rotor-borne flight. The orientation of the aircraft is advantageously at least partially automatically controlled.

Figure 3:
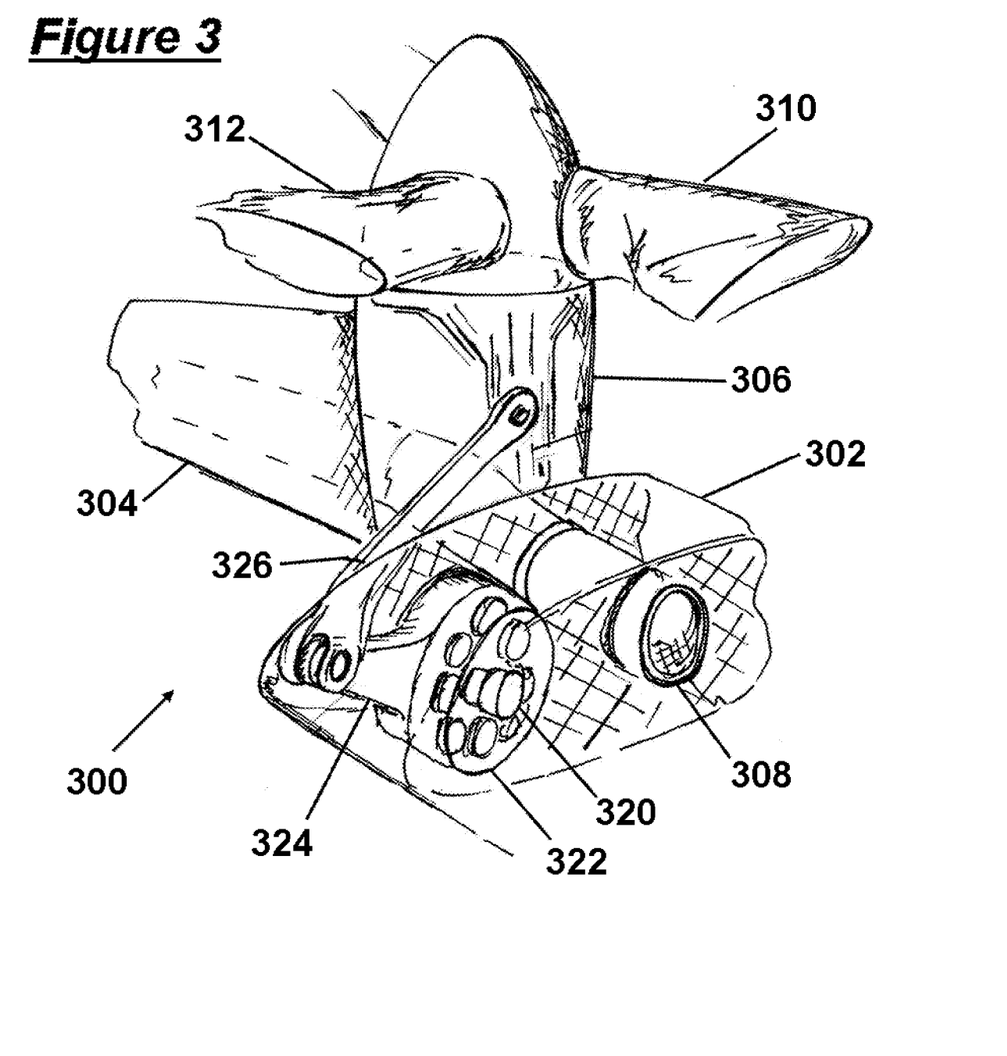
FIG. 3 is a perspective illustration of a preferred tilting rotor system of a tiltrotor aircraft.

FIG. 3 is a perspective illustration of a preferred tilting rotor system 300 of a tiltrotor aircraft as described in U.S. patent application Ser. No. 12/422042. The rotor system 300 has a rotor comprising first and second blades 310, 312 that rotate with respect to a tilting nacelle 306 that is also a tilting mast. An outboard wing 304 is coupled to the tilting nacelle 306 and rotates with the nacelle 306. The tilting nacelle 306 tilts with respect to an inboard wing 302, coupled to an aircraft fuselage. An actuator comprises a motor 320 and a reduction gearbox 322 predominately disposed within the inboard wing 302. It is contemplated that the tilt actuators can be used in cooperation with other aircraft controls or actuators in order to maneuver and orient a preferred aircraft into a desired orientation.

The reduction gearbox 322 is coupled to a first link 324 and second link 324, which can transfer a motive force to the nacelle. The nacelle rotates about a support spar 308. A tilting rotor system is advantageously coupled to an automatic control system that assists in tilting the airframe while the rotor axes of rotation remain within 15° of vertical. It is contemplated that the rotor could generate a mast moment using cyclic blade pitch in order to assist in the rotation of the aircraft and cargo hold for preferred methods of payload delivery.

The automatic control system can advantageously include a control interface 180. Contemplated control interfaces include physical or virtual buttons, a special control stick or lever or grip, touch screen, or any other suitable interface.

It is contemplated that preferred methods are of particular utility to VTOL aircraft that can generate control moments in addition to thrust. Hingeless rotors and propellers with a cyclic capability are an especially preferred VTOL propulsion system also capable of generating moment. A moment-generating capability assists in providing control of rotor angle or propulsion angle independently of fuselage or cargo hold angle. While hingeless rotors and VTOL aircraft were known in the prior art, what the prior art failed to appreciate was that propulsion angle and fuselage could be advantageously independently controlled to facilitate precision delivery of a payload.

Preferred aircraft are capable of delivering a cargo or payload of 2000 pounds, 5000 pounds, 10000, pounds, 20000 pounds, or even 40000 pounds. Especially preferred aircraft are capable of generating a control moment to assist in orienting the vehicle and delivering a payload of 10000 foot-pounds, 25000 foot-pounds, 50000 foot-pounds, 200000 foot-pounds or even more. Preferred lines include those capable of supporting a load of 1000 pounds, 10000 pounds, 25000 pounds, or even more. A high precision payload delivery is one in which a payload is placed into a loading zone with an area no greater than twice the projected area of the payload. The terms cargo and payload are used interchangeably.

All suitable aircraft are contemplated, including for example, a VTOL aircraft of the tilt-wing variety, in which the aircraft would be converted at some point from a wing-borne flight mode to a rotor-borne flight mode. The aircraft in FIGS. 4-7 should be interpreted generically to include all such possibilities.

An exemplary especially preferred method is illustrated with the aid of FIGS. 4-7.

Figure 4:
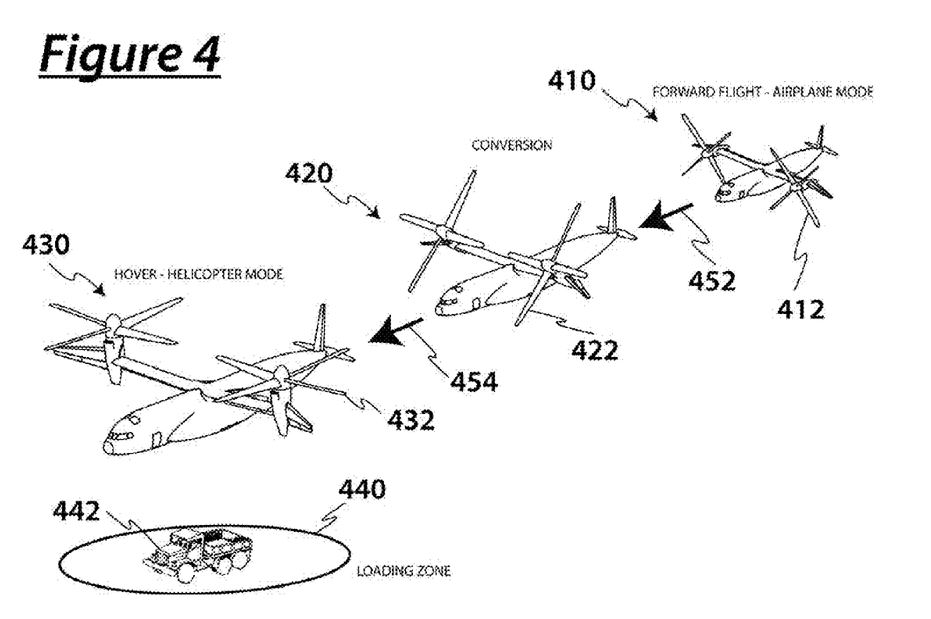
FIG. 4 is a perspective illustration of a VTOL aircraft converting and coming to a hover over a loading zone.

FIG. 4 is a perspective illustration of a VTOL aircraft converting and coming to a hover over a loading zone. The aircraft in wing-borne airplane-mode cruise forward flight 410 is shown with the rotors 412 rotating in a substantially vertical plane and flying forward in the direction indicated by arrow 452. The aircraft subsequently performs a standard tilt-rotor or tilt-wing conversion from wing-borne flight to helicopter like flight, and coming to hover over the desired spot, with the rotorcraft fuselage and cargo hold being approximately horizontal in such hover.

The aircraft slows and enters conversion mode 420, with rotors 422 at an oblique angle; the aircraft retains some forward speed as indicated by arrow 454. Subsequently, the aircraft slows and enters a hover in a VTOL-mode or helicopter-mode configuration 430. In this configuration, rotors 432 of a tiltrotor or tiltwing aircraft turn in a substantially horizontal plane. Hovering flight is advantageously performed over a loading zone 440 or other desired spot that may be in the vicinity of a vehicle 442 or other cargo.

Figure 5A:
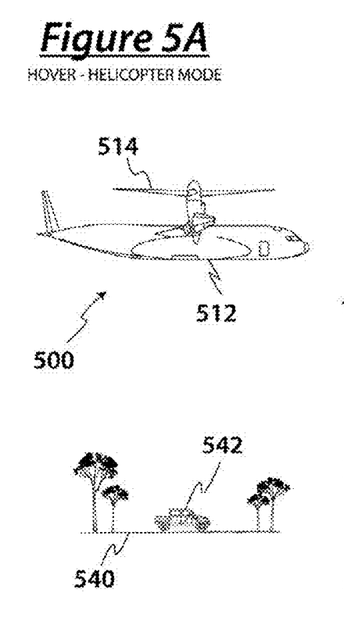
FIGS. 5A-5C are side view illustrations of steps of a VTOL aircraft maneuvering into a desired orientation.
Figure 5B:
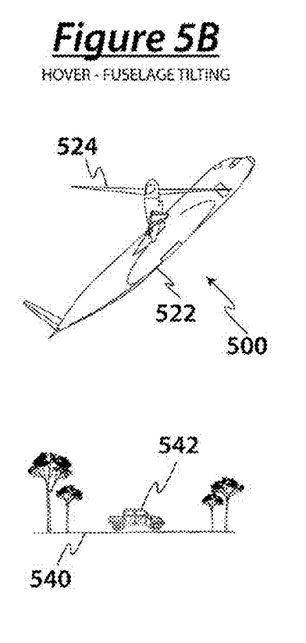
Figure 5C:
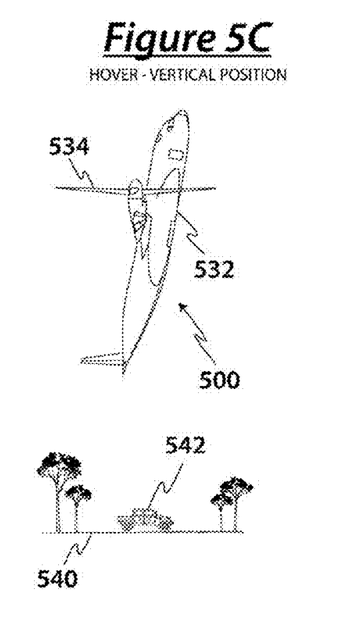
Figure 6A:
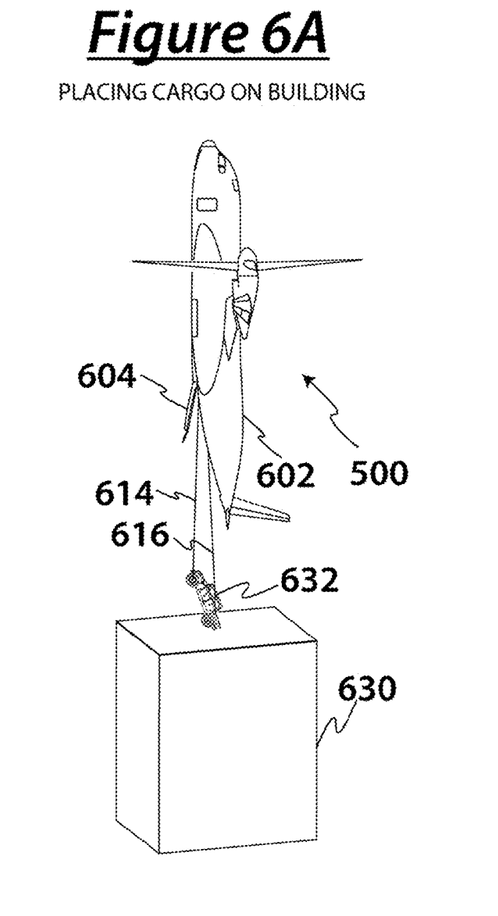
FIGS. 6A and 6B are side view illustrations of steps of a VTOL aircraft performing a high precision payload delivery.
Figure 6B:
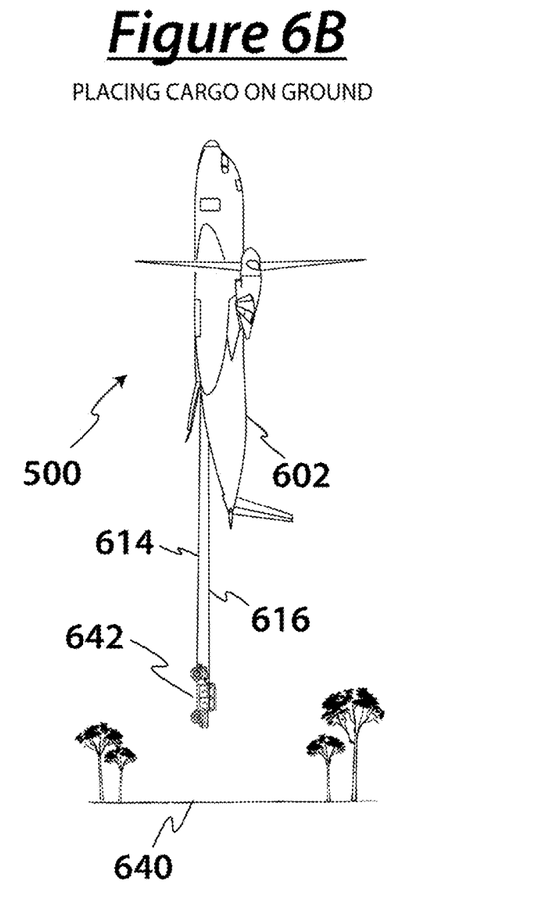
Figure 7A:
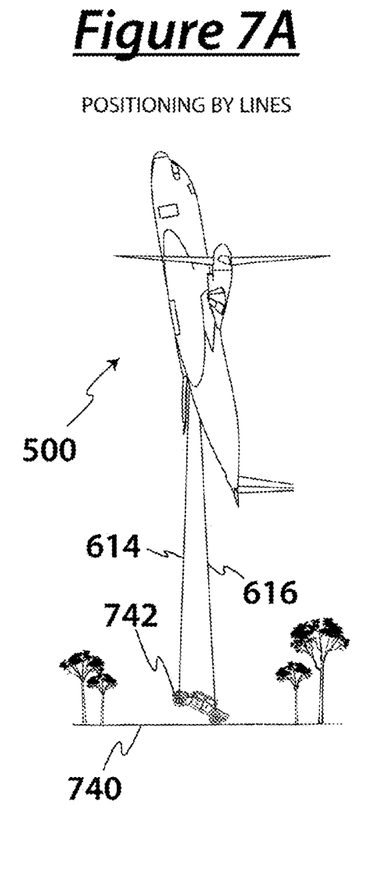
FIGS. 7A and 7B are side view illustrations of alternate means of orienting and precision delivering a payload using a VTOL aircraft.
Figure 7B:
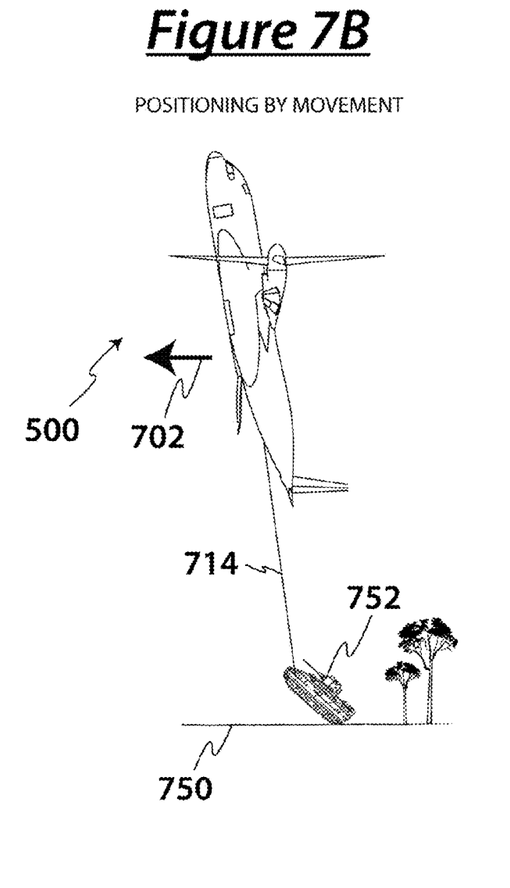

Some prior art aircraft, including, for example, the V-22 or XC-142A are capable of a conversion from wing-borne to rotor-borne flight, but are not capable of performing subsequent steps depicted in FIGS. 5-7 herein.

FIGS. 5A-5C are side view illustrations of steps of a VTOL aircraft maneuvering into a desired orientation. In FIG. 5A, the aircraft 500 continues to hover over a loading zone 540 at ground level containing a vehicle 542 with a wheels-down orientation. The fuselage 512 is in a substantially horizontal position, and the weight of the aircraft 500 is supported by rotors 514 turning in a substantially horizontal plane or other propulsion means.

In FIG. 5B, the aircraft 500 is commanded to reorient the fuselage, preferably using at least partially automatic control. The fuselage 522 of the aircraft 500 is at an oblique nose-up angle over the loading zone 540. The aircraft 500 continues to hover in place with rotors 524 turning in a horizontal plane and is substantially stationary with respect to the cargo 542.

In FIG. 5C, the aircraft 500 is still hovering over the loading zone with rotors 534 turning in a horizontal plane. However, the aircraft 500 has maneuvered using partially or fully automatic control in such a way that the fuselage 532 is a nose-up orientation and is within 15° of vertical. The nose-up orientation of the fuselage with respect to the rotor or loading zone is advantageously achieved using a combination of rotor or propeller moment and tilt actuation.

FIGS. 6A and 6B are side view illustrations of steps of a VTOL aircraft performing a high precision payload delivery.

In FIG. 6A, an aircraft 500 delivers a payload 632 on the top of a building 630 that serves as a loading zone. The aircraft 500 has a fuselage 602 that is in a substantially vertical nose-up position. A cargo ramp 604 that is also a door to the fuselage 602 is open. The vehicle payload 632 is supported by a first line 614 and a second line 616. The orientation of the payload 632 is controlled by differentially adjusting the length of lines 614, 616 using a winch or other means. The payload 632 is lowered using the same lines 614, 616.

In FIG. 6B, an aircraft 500 delivers a payload 642 into a loading zone 640 that is a small cleared area in a forest. The fuselage 602 is again in a substantially vertical nose-up position. The loading ramp is opened, and the payload 642 is winched or otherwise lowered down to a desired height (that may or may not be ground level) above the loading zone 640. Subsequently, lines 614, 616 could be uncoupled from the payload 642 or the fuselage 602 to deliver the payload 642.

FIGS. 7A and 7B are side view illustrations of alternate means of orienting and precision delivering a payload using a VTOL aircraft.

In FIG. 7A, the aircraft 500 lowers, orients, and delivers a payload 742 in a wheels-down configuration to a loading zone 740 by means of multiple lines 614, 616 the length of that are controlled by winches or other mechanisms.

In FIG. 7B, the aircraft 500 lowers, orients, and delivers a payload 752 in a wheels-down configuration to a loading zone 740 by means of a line 714 and aided with horizontal forward motion of the aircraft 500 in the direction indicated by arrow 702.

Thus, specific embodiments and applications of hover delivery of cabin payloads have been disclosed. It should be apparent, however, to those skilled in the art that many more modifications besides those already described are possible without departing from the inventive concepts herein. For example, the methods described herein are equally applicable to picking up a payload. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of delivering an item of cargo from a cargo hold of an aircraft during flight, comprising:
    orienting the aircraft into nose-up and tail-down position at least 30° off horizontal;
    lowering the cargo from the cargo hold using a line; and
    uncoupling the line, wherein the aircraft is a tilt rotor aircraft having an airframe and first and second rotors, each having an axis of rotation, further comprising the step of operating a control interface that assists in tilting the airframe while the rotor axes of rotation remain within 15 degrees of vertical.

2. The method of claim 1, wherein the step of orienting comprises pointing the nose to within 15° of vertical.

3. The method of claim 1, wherein the step of orienting comprises pointing the nose in a range from 45° to 100° nose up.

4. The method of claim 1, wherein the aircraft is a VTOL aircraft.

5. The method of claim 1, wherein the aircraft is a tilt-rotor aircraft.

6. The method of claim 1, wherein the aircraft is a tilt-wing aircraft.

7. The method of claim 1, further comprising converting the aircraft from a wing-borne flight mode to a rotor-borne flight mode.

8. The method of claim 1, further comprising executing the step of orienting after beginning conversion of the aircraft from a wing-borne flight mode to a rotor-borne flight mode.

9. The method of claim 1, further comprising executing the step of orienting after completion of conversion of the aircraft from a wing-borne flight mode to a rotor-borne flight mode.

10. The method of claim 1, further comprising providing a guide that biases the cargo against a floor of the cargo hold.

11. The method of claim 1, further comprising providing a guide that biases the cargo away from a wall of the cargo hold.

12. The method of claim 1, further comprising utilizing an at least partially automatic control to execute the step of orienting.

13. The method of claim 1, wherein the cargo has a wheels-down or track-down configuration, and further comprising operating a second line to help position the cargo in the wheels-down or track-down configuration.

14. The method of claim 1, further comprising the step of using a horizontal movement of the aircraft to help position the cargo in the wheels-down or track-down configuration.

15. The method of claim 1, further comprising the step of an operator trying to maintain a position of the aircraft stationary with respect a loading zone during the step of lowering the cargo.

* * * * *